United States Patent [19]
Sasaki et al.

[11] Patent Number: 4,767,178
[45] Date of Patent: Aug. 30, 1988

[54] OPTICAL FIBER CONNECTOR HAVING STRUCTURE FOR ENSURING PREDETERMINED SPACING OF OPTICAL ELEMENTS

[75] Inventors: Hiroaki Sasaki; Yoshinori Miyahara, both of Furukawa, Japan

[73] Assignee: Alps Electric Co., Ltd., Japan

[21] Appl. No.: 849,746

[22] Filed: Apr. 9, 1986

[30] Foreign Application Priority Data

Apr. 9, 1985 [JP] Japan .............................. 60-52330[U]

[51] Int. Cl.$^4$ .................................................. G02B 6/36
[52] U.S. Cl. .................................. 350/96.20; 350/96.21
[58] Field of Search ................ 350/96.20, 96.21, 96.22

[56] References Cited

U.S. PATENT DOCUMENTS

| | | | |
|---|---|---|---|
| 4,118,105 | 10/1978 | Voigt | 350/96.20 X |
| 4,285,572 | 8/1981 | Beaudette et al. | 350/96.20 |
| 4,385,800 | 5/1983 | Basola et al. | 350/96.20 X |
| 4,409,815 | 10/1983 | Burkel et al. | 350/96.20 X |
| 4,458,983 | 7/1984 | Roberts | 350/96.20 |
| 4,461,538 | 7/1984 | Breed, III et al. | 350/96.20 |
| 4,461,539 | 7/1984 | Bailey et al. | 350/96.20 X |
| 4,468,087 | 8/1984 | Milan et al. | 350/96.18 |
| 4,615,581 | 10/1986 | Morimoto | 350/96.21 |

OTHER PUBLICATIONS

Balliet, L. & Sassen, B., "Optical Fiber End Separation Spacer for Fiber Connectors", IBM Technical Disclosure Bulletin, vol. 27, No. 4B, 9-1984, pp. 2427-2428.
Wittmann, J. E., "Fiber Optics Interconnection System for Airborne Electronics", 10th Annual Connector Symposium Proceedings, Oct. 19-20, 1977, pp. 212-224.

*Primary Examiner*—John Lee
*Attorney, Agent, or Firm*—Guy W. Shoup

[57] ABSTRACT

A gap between end surfaces of optical converters provided at the ends of optical guide paths of optical fibers is maintained with a high accuracy and thereby optical coupling efficiency of such optical converters can be improved with an optical fiber connector comprising a plug engaging member at the end of optical guide path and a plug which is removably engaged with said plug engaging member having the structure that a spacer is provided between both surfaces of said optical guide path ends, an optical guide path hole is formed to said spacer and a constant gap is formed both end surfaces of optical converters provided at the surface of said optical guide path ends through said optical guide path hole.

6 Claims, 6 Drawing Sheets

OPTICAL FIBER CONNECTOR HAVING STRUCTURE FOR ENSURING PREDETERMINED SPACING OF OPTICAL ELEMENTS

BACKGROUND OF THE INVENTION

1. Field of the Invention

The present invention relates to a optical fiber connector for removably coupling an optical converter at the end surface of optical guide path provided for optical coupling between an optical fiber and an optical conversion element such as LED, phototransistor, photodiode, etc. and between optical fiber cables and more specifically to a connector which can stabilize the coupling efficiency by maintaining the coupling gap between materials to be coupled with a high accuracy.

2. Description of the Prior Art

An optical data transmission system utilizing optical fibers and optical conversion elements is now widely introduced into the field of communication systems and particularly the optical fibers are much expected for the future as a means of low loss and large capacity data transmission line.

An optical data transmission system is required to use connectors for coupling optical fiber and optical conversion element or end surfaces of optical guide paths of optical fibers.

For the coupling of them, a constant gap (for example, about 50 μm) must be prepared between end surfaces of optical converters provided at the end part of optical guide paths.

Here, a prior art for coupling the optical guide paths of an optical conversion element and an optical fiber is explained with respect to FIG. 11 and FIG. 12. A light receptacle 1 comprises an optical conversion element 2 such as a LED, phototransistor, photodiode, etc. and is also provided with a cylindrical part 1b having the external thread 1a. At the center of junction end surface of such optical conversion element 2 is provided with an optical converter 2a which is a light receptor and emitter (consisting of receptor and emitter) and an elastic member 2b is also provided at the rear surface of optical conversion element 2.

Meanwhile, a plug to be coupled with a light receptacle 1 is composed of a holding member which holds an optical fiber 4 and a cap nut having an engaging part 6a at the internal circumference thereof. This holding member 5 continuously forms a front cylindrical part 5a, a collar part 5b and a rear cylindrical part 5c. The front cylindrical part 5a holds an optical fiber 4, and both end surfaces of front cylindrical part 5a and optical fiber 4 are ground to the same surface level. The rear cylindrical part 5c holds an optical fiber cable 7 covering an optical fiber 4 and the optical fiber cable 7 is fixed in such a fashion that a fixing device 8 is engaged with the rear cylindrical part 5c which is also formed with a slit 5d.

The plug 3 can be coupled with such light receptacle 1 in this way. Namely, the front cylindrical part 5a of holding member 5 is inserted into a cylindrical part 1b and the cap nut 6 is engaged and both end surfaces of collar part 5b engages with the cylindrical part 1b and the engaging part 6a of cap nut 6. In this timing, the receptacle and plug are coupled in the condition shown in FIG. 12, forming a gap A between the optical fiber end surface and optical converter.

However, according to the prior art, the gap A between the optical converter 2a of optical conversion element 2 and the end surface of optical guide path of optical fiber 4 is determined by the length D of the front cylindrical part 5a of holding member and positional relation between the position where the collar part 5b collides with the end surface of cylindrical part 1b of light receptacle 1 and the optical converter 2a of optical conversion element 2.

Therefore, the gap A includes fluctuation of the length B from the internal rear wall 1c of light receptacle 1 to the cylindrical part 1b, the length C from the elastic member 2b provided at the rear surface of optical conversion element 2 to the end surface of optical fiber 4 And the length D from the end surface of holding member 5 to the collar part 5b, and the gap A exceeds the desired allowance of size and can no longer maintain the constant size. The end surfaces of optical guide paths of optical converter 2a and optical fiber 4 are, as a result, in contact with each other or separated too much.

As described above, when the optical converter 2a and optical fiber 4 are in contact with each other, flaws may be generated at the contact surface or dewing phenomenon is generated by water, remarkably making unstable the optical signal transmission characteristic. Moreover, if the gap A is too large, the conversion efficiency in the optical signal transmission characteristic of receptacle and plug is lowered and transmission intensity of optical signal is deteriorated.

SUMMARY OF THE INVENTION

In order to accomplish the above-described objects, the constitution of the present invention for an optical fiber connector comprises: a holding member (16, 21b) holding the end of an optical fiber and being abuttingly disposed in a plug (14, 21); a plug engaging member (11, 23, 22a) removably engaged with the plug and having a portion for receiving the end of the optical fiber holding member therein; an optical element (12) disposed within the plug engaging member which is to be located opposite the optical fiber end by a predetermined distance; a spacer (13, 20, 24, 30) having a thickness corresponding to the predetermined distance and having an optical path hole (13b, 20b, 24b, 30b) for light transmission therethrough; an engaging portion (17b, 21c) of the plug which is engaged with an engaged portion (11a, 23a, 22b) of the plug engaging member so as to secure the plug and plug engaging member together with the optical fiber holding member end surface (16e, 17e, 21g) abutted against the spacer; and the holding member having a length from its end surface to a collar portion (16b), which is abuttingly pushed by a part (17a) of the plug, such that a gap (B') is provided between the collar portion and the receiving portion of the plug engaging member, in order to ensure that the holding member end surface is abutted against the spacer when the plug is engaged with the plug engaging member, whereby the optical fiber end is accurately spaced from the optical element by the spacer's thickness.

In brief and in accordance with one aspect of the prevent invention, an optical fiber connector comprising an plug engaging member at the end of optical guide path and a plug which is removably engaged with said plug engaging member provides, in view of attaining such object, the structure that a spacer is provided between both surfaces of said optical guide path ends, an optical guide path hole is formed to said spacer and a constant gap is formed both end surfaces of optical converters provided at the surface of said optical guide path ends through said optical guide path hole.

In case of coupling optical conversion element and optical fiber or optical fibers, the optical guide path supporting end surfaces of optical fibers, etc. collide through the spacer and a optical guide path hole is formed to such spacer. Therefore, a constant gap can be provided between the end surface of optical converters provided at the optical guide path end.

In this case, fluctuation of such gap is only the allowance of size of thickness at the surface where the spacer exists and is not related to fluctuation of other members. Thereby, a highly accurate gap can be maintained and the coupling efficiency of optical converters can be as much stabilized.

The novel features which are believed to be characteristic of the invention, both as to organization and method of operation, together with further objects and advantages thereof, will be understood from the following description considered in connection with the accompanying drawings in which several preferred embodiments of the invention are illustrated by way of example. It is to be understood, however, that the drawings are for the purpose of illustration and description only and are not intended as a definition of the limits of the invention.

BRIEF DESCRIPTION OF THE DRAWINGS

FIG. 1 is a sectional view illustrating the condition where an optical fiber and an optical conversion element are to be coupled.

FIG. 2 is a sectional view illustrating the coupling condition of an optical fiber and an optical conversion element.

FIG. 3 is a perspective view illustrating separated condition of a light receptacle.

FIG. 4 and FIG. 5 are sectional views illustrating other embodiment of coupling condition of an optical fiber and an optical conversion element.

FIG. 6 is a perspective view illustrating separated condition of a light receptacle.

FIG. 7 is a perspective view illustrating separated condition of a plug.

FIGS. 8 and 8(a) illustrate sectional views showing the before and after conditions in which a snap-in type optical fiber and an optical converter element are coupled to each other.

FIG. 9 and FIG. 10 are sectional views illustrating examples of connector which couples optical fibers with each other.

DESCRIPTION OF THE PREFERRED EMBODIMENTS

FIG. 1 to FIG. 10 illustrate embodiments of an optical fiber connector in which the present invention is applied.

Figure 1:
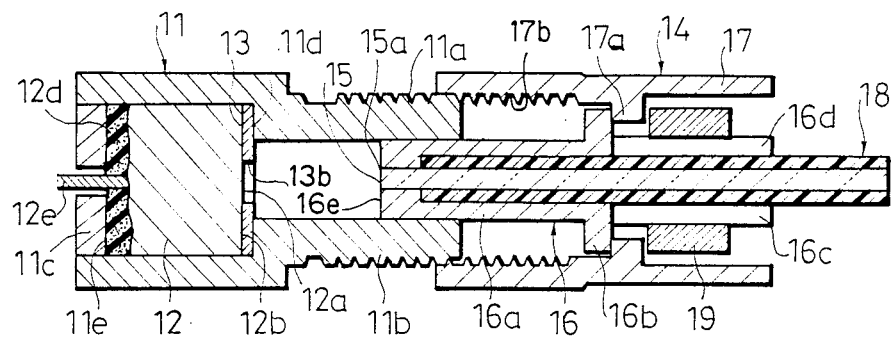
FIG. 1 to FIG. 10 are embodiments of an optical fiber connector to which the present invention is applied.

FIG. 1 to FIG. 7 represent respective examples of coupling an optical conversion element and an optical fiber. Turning first to FIG. 1, a light receptacle 11 (plug engaging member) comprises an optical conversion element 12, for example, such as an LED, phototransistor and photodiode, etc., a front part of the optical receptacle 11 is provided with a cylindrical part 11b having external threads 11a which is the engaged part of the connection. Moreover, an optical converter 12a which is a light receptor/light emitter (i.e. a light emitting or receiving element which forms one side of the optical connection) is provided at the center of the engaging surface 12b provided at the front side of optical conversion element 12. Moreover, an elastic member 12d is provided at the rear surface of the optical conversion element 12 and this elastic member 12d is fixed with a fixing device 11c, and an external lead 12e is provided to the optical conversion element 12.

Numeral 13 represents a spacer which has adequate thickness (about 50 $\mu$m) and forms an optical guide path hole 13b. The external circumference at the one side of this spacer 13 collides with the front inner wall 11d of the light receptacle 11 and the other side thereof collides with the engaging surface 12b of the optical conversion element 12.

Meanwhile, a plug 14 which is coupled with the light receptacle 11 is composed of a holding member 16 which holds an optical fiber 15 and constituted by a cap nut 17 having an internal thread 17a which is the engaging part of the connection that is threaded on the external thread of the cylindrical part 11b so as to push the collar part 16b in the plug insertion direction by abutment therewith.

This holding member 16 is composed of a front cylindrical part 16a, a collar part 16b and a rear cylindrical part 16c. The front cylindrical part 16a holds an optical fiber 15. The front cylindrical part 16a and the end surface of the optical fiber 15 are ground flush with each other to form the fiber end surface 15a and holding member end surface 16e.

Figure 2:
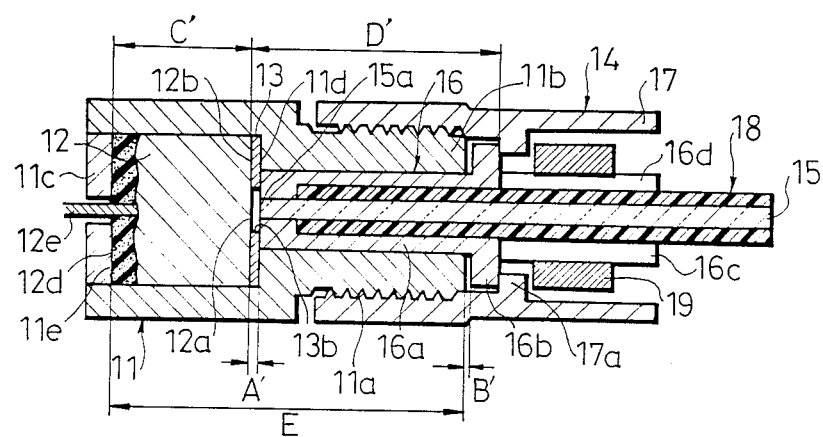
Figure 3:
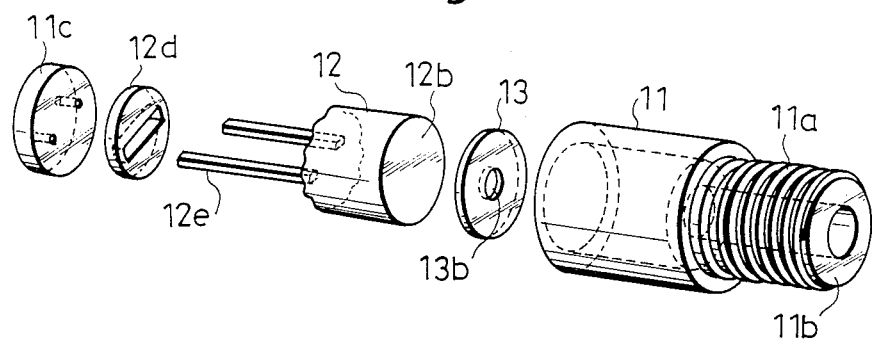
Figure 6:
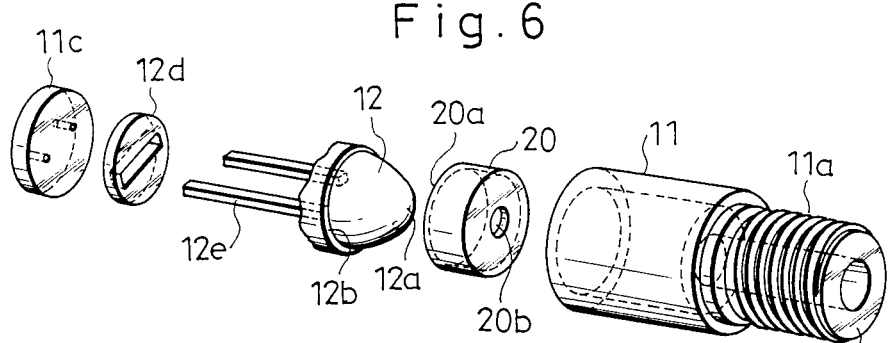
Figure 7:
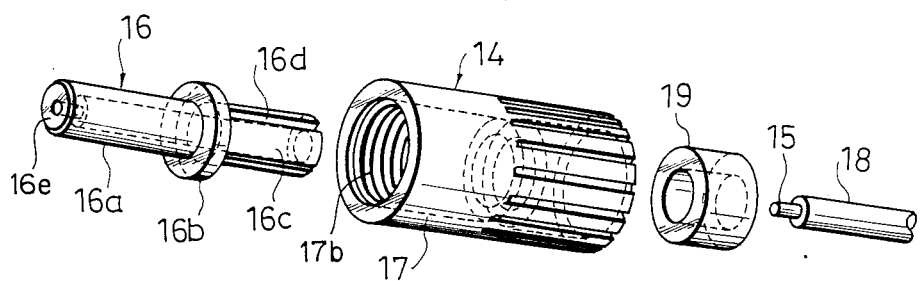

In FIG. 2, the end surface of holding member 16 collides with the one side of spacer 13 and thereby the optical converter 15a of optical fiber 15 is opposed against the optical converter 12a of optical conversion element 12 through the optical guide path 13b of spacer 13, holding a gap A' between such optical converters.

An optical fiber cable 18 having the covarage 18a at the external circumference of optical fiber 15 is held by the rear cylindrical part 16c and the optical fiber cable 18 is fixed by engaging a fixing device 19 with the rear cylindrical part 16c forming a slit 16d.

The gap B' is formed between the end surface of cylindrical part 11b of light receptacle 11 and the end surface of collar part 16b when the light receptacle 11 and plug 14 are coupled.

The length of gap B' is capable of absorbing all fluctuations in the respective lengths E from the rear internal wall 11e to the ens surface of cylindrical part 11b of light receptacle 11, C' from the rear surface of elastic member 12d loaded to the optical conversion element 12 to the engaging surface 12b of optical conversion element 12 and D' from the front end surface of holding member 16 to the engaging surface of collar part 16b when it is set larger than the fluctuation adding respective fluctuations of said lengths.

Operations of this embodiment mentioned above will then be explained hereunder.

When the front cylinder part 16a of the holding member 16 which is holding an optical fiber 15 is inserted into the cylindrical part 11b of the light receptacle 11 and the cap nut 17 is engaged by the thread with the external thread 11a of the light receptacle 11, the holding member 16 enters the interior of light receptacle 11 while the engaging part 17a of cap nut 17 is engaging with the collar part 16b and the end part of holding member 16 is inserted up to the position where it collides with the front end 12b of the optical conversion element 12.

In this case, the other end of spacer 13 collides with the engaging surface 12b of the optical conversion element 12 and thereby a required gap A' is defined between the optical converter 15a of optical fiber 12 and the optical converter 12a of optical conversion element 12. Therefore, there is only a fluctuation of gap A' and a gap having a high accuracy can be formed. Moreover, fluctuations of other members are all absorbed by the gap B' and the gap A' is not influenced by such fluctuations and an extra external force is not applied to the optical converter 12a of optical conversion element 12 by the front end of holding member 16.

Figure 4:
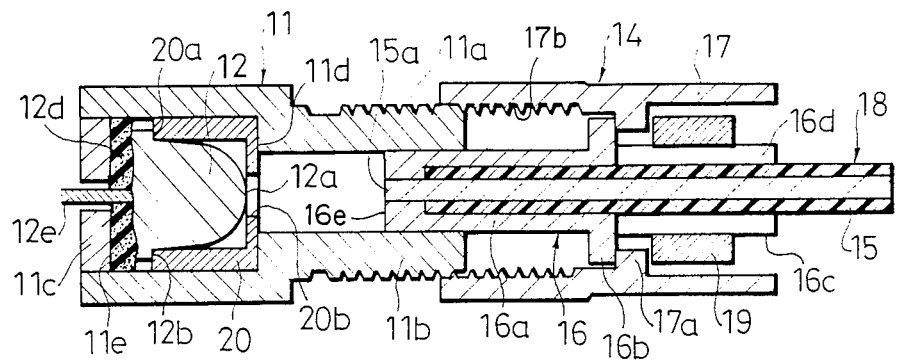
Figure 5:
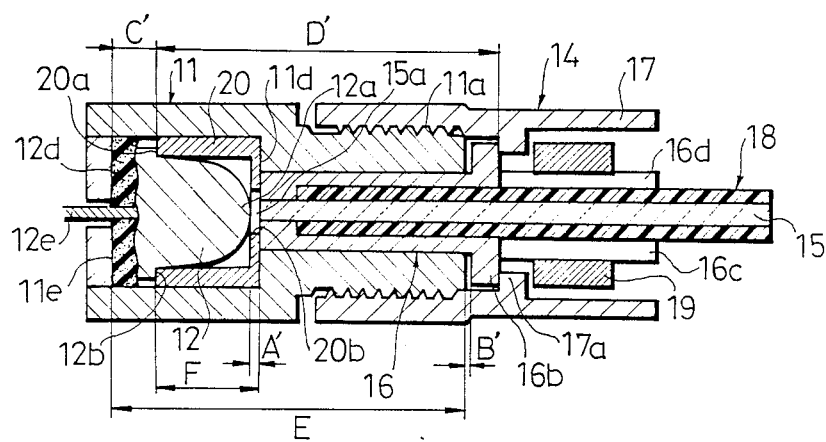

FIG. 4 illustrates another embodiment of the present invention. The same parts as those described above are given the same symbols and these are not explained detail hereunder.

In FIG. 4, the front surface of optical conversion element 12 is formed like a semi-circle, an engaging surface 12b is formed at the base part, an elastic member 11d is loaded to the rear surface of optical conversion element 12 and a fixing device 11e is also provided.

20 is a cylindrical spacer of which one side forms the engaging part 20a which engages with the engaging surface 12b of the optical conversion element 12, while the other side forms the optical guide path hole 20b and this spacer is loaded to the front internal wall 11f of the light receptacle 11. The end part of holding member 16 collides with the one side of spacer 20 and the gap A' between the optical converter 15a of optical fiber 15 and the optical converter 12a is formed to about 50 μm with a high accuracy. This gap A' is not influenced by fluctuations of other members and includes only fuctuation of the gap A' itself.

Of course the gap B' is set larger than a total sum of fluctuations in the lengths C', D', E and the length F from the engaging surface 12b of optical conversion element 12 to the front internal wall 11c of the light receptacle 11 and the gap B' absorbes such fluctuations.

Figure 8:
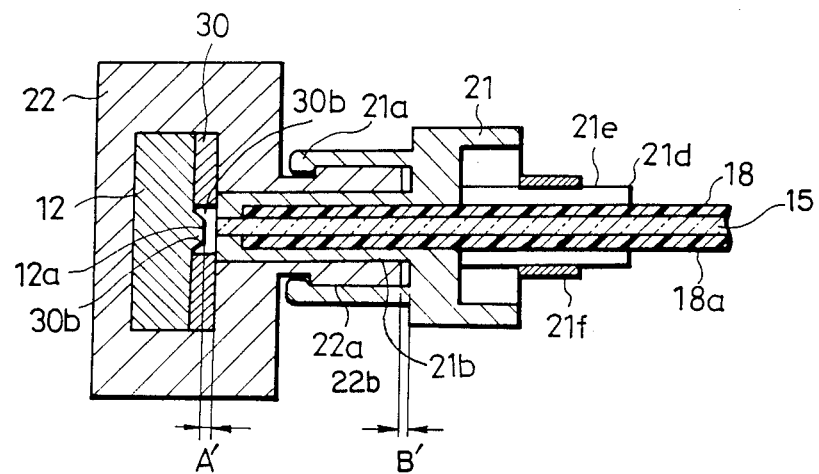
Figure 8A:
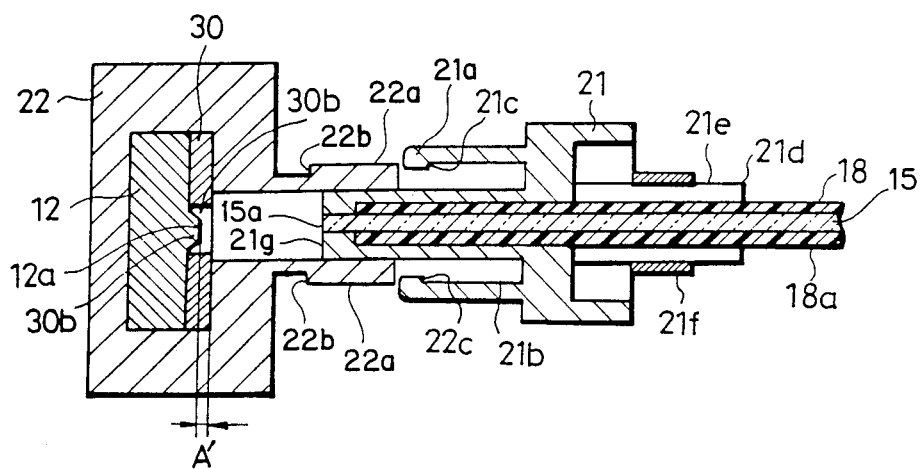

FIGS. 8 and 8(a) illustrate an example in which the connector parts can be removably engaged with a snap-in type system, and the same elements therein as that of the above-described embodiments are referenced with the same characters.

A plug 21 of the snap-in type is connected and fixed to an engaging cylindrical step 22a arranged at the front end of an optical receptacle 22 (plug engaging member) by a plurality of split-type engaging pieces 21a at the front end of the plug 21. The engaging pieces 21a have inner circumferential step portions 21c which are engaged with corresponding step portions 22b. The end surface 21g of the holding member 21b holding the optical fiber end 15a is thereby brought into abutting contact against the spacer 30 by the engaging force of the engaging pieces 21a snapped onto the step portions 22b.

Moreover, illustrated is an example where the spacer 30 having the optical guide path hole 30b is provided between the optical converter 15a at the optical guide path end of the optical fiber 15 and the optical converter 12a of the optical conversion element 12. In the same figure, 21d a cylindrical part having the slit 21e provided at the rear part of plug 21 and 21f is a fixing device.

In the inserted condition shown in FIG. 8, a gap B' is provided in the same manner as that of the above-described embodiments.

Figure 9:
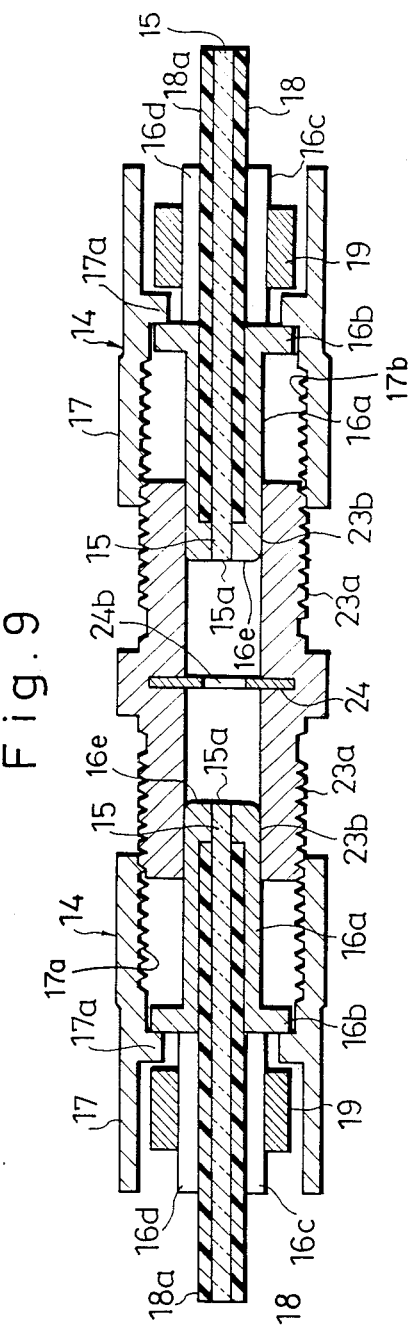
Figure 10:
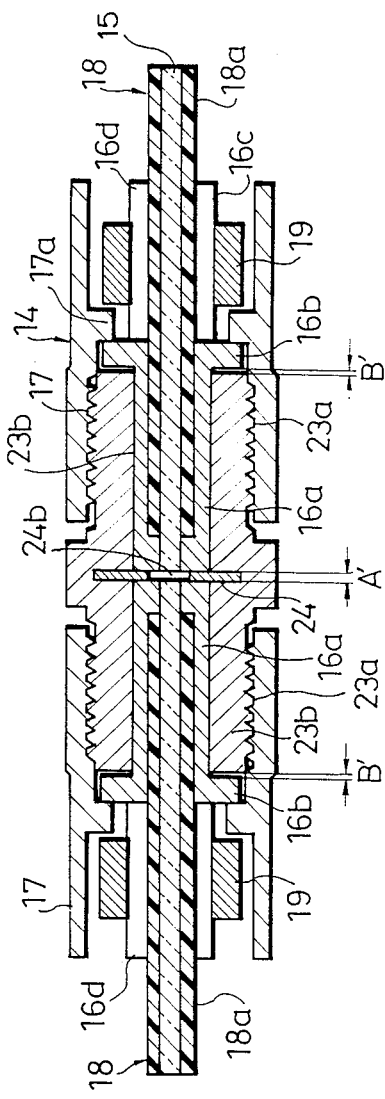
Figure 11:
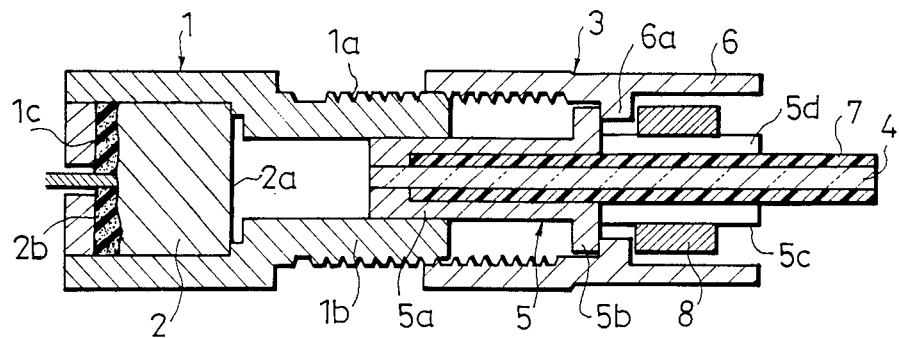
FIG. 11 and FIG. 12 are sectional views illustrating a prior art.
Figure 12:
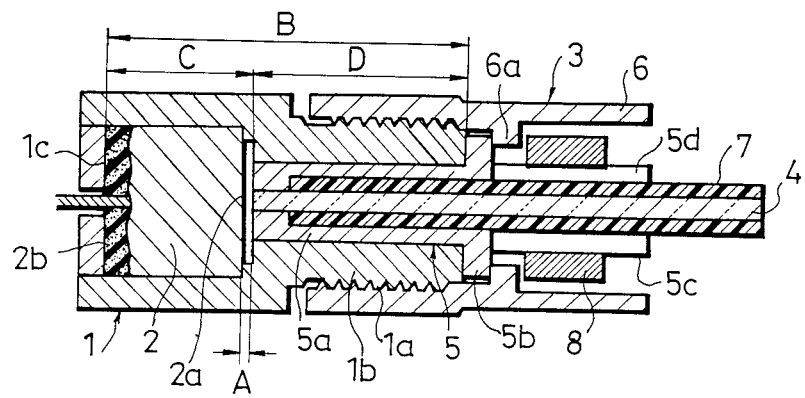

Each embodiment described above is an example of connector for removably coupling optical converters at the optical guide path ends of optical conversion element and optical fiber. The present invention is not limited only to these embodiments. For example, the present invention can also be adopted to the connectors which removably couple the optical converters of optical guide path ends of optical fibers as shown in FIG. 9 and FIG. 10.

In the same figures, the same parts as those in above embodiments are given the same symbols. Numeral 23 represents an adapter (plug engaging member) having external thread 23a for engaging the optical converter 15a of optical fiber 15. The spacer 24 having the optical guide path hole 24b is loaded to the center of this adapter. The holding member 16 is inserted from both ends 23a, 23a of the adapter 23 and the spacer 24 is provided between the holding member 16, 16. As shown in FIG. 10, when the optical fibers 15, 15 are collided with each other, a cnstant gap A' is defined between the end surfaces of optical converters 15, 15. As in the case of above example, fluctuations of other members are absorbed by providing the gap B'. Therefore, the gap B' allows space to be present between the plug engaging member and the collar portion so that they do not abut each other, even despite differences in tolerances and dimensions of the various elements, whereby the end surface of the holding member is always assured to be pushed against the spacer. The plug 14 can select as required the connecting means such as the snap-in system in addition to the thread system illustrated in the figure.

As is obvious from above description, the present invention is characterized by the structure that the plug engaging member at the optical guide path end and plug are removably engaged with each other. The spacer is directly abutted by the end surface of the holding member which has a length that provides a gap B' so that the engaging part can be engaged with the engaged part to press the holding member against the spacer when the plug is inserted. The spacer is provided between both surfaces of optical guide path ends and a constant gap is defined between the end surfaces of the optical converters through the optical guide path hole formed at this spacer. Therefore, this gap A' includes only the fluctuation of the gap A' itself and is not influenced by fluctuations of other members. The gap A' can be defined with a high accuracy and is kept constant even after the use for a long period of time, resulting in a highly reliable connector. Moreover, the optical coupling efficiency between the optical conversion element and optical fiber and between the optical fibers can be much more stabilized.

Although particular embodiments of the present invention have been described and illustrated herein, it is recognized that modification and equivalents may readily occur to those skilled in the art. Consequently, it is intended that the claims may be interpreted to cover such modifications and equivalents and that the invention be limited only thereby.

What is claimed is:

1. An optical fiber connector comprising:
 a holding member having a front part for holding an end of an optical fiber therein and a collar part extending radially outward from the optical fiber, wherein a selected length is provided between a front end surface of said front part and said collar part;

a plug in which said holding member is disposed having an internal part extending radially inward toward the optical fiber which abuts against said collar part of said holding member to press it axially in an insertion direction, and an engaging part formed integrally with said internal part disposed toward a front end of said plug;

a plug engaging member having a receptacle portion in which an optical element is mounted, a front portion for receiving said front part of said holding member, wherein said front end surface of said holding member is to be disposed opposite the optical element in said plug engaging member by a predetermined distance, and an engaged part formed on said front portion which is removably engaged with said engaging part of said plug;

a spacer having a thickness corresponding to said predetermined distance and an optical path hole for light transmission therethrough and being interposed in abutting contact between said front end surface of said holding member and said optical element when said front part of said holding member is inserted in said front portion of said plug engaging member with said internal part of said plug abuttingly pressing said collar part of said holding member by a force of said engaging part of said plug engaged with said engaged part of said plug engaging member;

wherein said length of said holding member is selected such that when said holding member is inserted in said front portion of said plug engaging member to bring said front end surface of said front part of said holding member into abutting contact with said spacer, a gap is provided between said collar part of said holding member and said front portion of said plug engaging member which allows sufficient space in case of differences in tolerances of said parts such that said front portion of said plug engaging member does not abut against said collar part, in order to ensure that said front end surface of said holding member can be tightly pressed against said spacer by the force of engagement of said engaging part of said plug with said engaged part of said plug engaging member, whereby the optical fiber end is accurately spaced opposite the optical element by the thickness of said spacer.

2. An optical fiber connector as claimed in claim 1, wherein said engaging part is an internal thread at the front end of an internal cylindrical bore of said plug in which said holding member is disposed, and said engaged part is a corresponding external thread on said front portion of said plug engaging member.

3. An optical fiber connector as claimed in claim 1, wherein said engaging part is a snap-in piece extending from the front end of said plug and said engaged part is a corresponding step on said front portion of said plug engaging member.

4. An optical fiber connector as claimed in claim 1, for forming an optical connection between two optical fiber ends, further comprising a second holding member for holding a second optical fiber end disposed in a second plug, said second holding member having a front part and a collar part, and said second plug having an internal part, front end, and an engaging part, which parts are the same as those of the first-mentioned holding member and plug, wherein said plug engaging member includes a rear portion for receiving the front part of said second holding member, the front end surface of said second holding member constituting the optical element in said plug engaging member which is to be disposed opposite the front end surface of the first holding member by said predetermined distance, and a second engaged part formed on said rear portion which is removably engaged with the engaging part of said second plug.

5. An optical fiber connector as claimed in claim 4, wherein the length of said second holding member is selected such that when the second holding member is fully inserted in the front portion of said plug engaging member to bring the front end surface of the front part of said second holding member into abutting contact with said spacer, a second gap is provided between the collar part and the rear portion of said plug engaging member, in order to ensure that the front end surface of said second holding member can be pressed against said spacer by a force of engagement of the engaging part of said second plug with the second engaged part of said plug engaging member, whereby the second optical fiber end is accurately spaced opposite the first optical fiber end by the thickness of said spacer.

6. An optical fiber connector as claimed in claim 4, wherein said spacer is mounted in position in the center of said receptacle portion of said plug engaging member between said front and rear portions thereof.

* * * * *